(12) United States Patent
Lin

(10) Patent No.: US 6,934,075 B1
(45) Date of Patent: Aug. 23, 2005

(54) MULTILAYER SINGLE LENS STRUCTURE WITH ZOOMING AND FOCUSING FUNCTIONS

(76) Inventor: Chien-Feng Lin, No. 14, Lane 9, Ankang St., Hsinchu City (TW)

( * ) Notice: Subject to any disclaimer, the term of this patent is extended or adjusted under 35 U.S.C. 154(b) by 0 days.

(21) Appl. No.: 11/010,081

(22) Filed: Dec. 13, 2004

(51) Int. Cl.[7] ............................ G02F 1/00; G02F 1/29; G02F 1/13
(52) U.S. Cl. ...................... 359/321; 359/319; 359/315; 344/200
(58) Field of Search ................................ 359/321, 319, 359/666, 665, 315, 298; 349/200

(56) References Cited

U.S. PATENT DOCUMENTS

2005/0018127 A1 * 1/2005 Galstian et al. ............. 349/200

FOREIGN PATENT DOCUMENTS

JP          11-133210       *   5/1999

* cited by examiner

Primary Examiner—Timothy Thompson

(57) ABSTRACT

The present invention discloses a multilayer single lens structure with zooming and focusing functions, particularly a lens structure that makes use of the special properties of crystalline grains and applying a voltage to achieve the zooming and focusing functions. The present invention comprises an object lens layer; an adjustable object lens layer, capable of adjusting its index of refraction; an imaging lens layer; and a voltage regulating device; wherein the order of arranging the object lens layer and the adjustable object lens layer is interchangeable, and these layers are connected to the imaging lens layer, and the voltage regulating device is electrically connected to the adjustable object lens layer for supplying different voltages to achieve the zooming and focusing functions.

7 Claims, 4 Drawing Sheets

MULTILAYER SINGLE LENS STRUCTURE WITH ZOOMING AND FOCUSING FUNCTIONS

FIELD OF THE INVENTION

The present invention relates to a multilayer single lens structure with zooming and focusing functions, more particularly to a lens structure that makes use of the special properties of crystalline grains after applying a voltage to achieve the zooming and focusing functions.

BACKGROUND OF THE INVENTION

As science and technology advances, our life also progresses rapidly. The development of semiconductors has brought us into the third industrial revolution. However, many products are improved in accordance with traditional technologies, and their applications are getting more user-friendly day after day, until these applications eventually encounter a bottleneck. Therefore, a single application generally faces the foregoing embarrassing situation, and people are seeking for technical breakthroughs to overcome the bottleneck.

For instance, the tricycle and bicycle developed in early days inspired the idea of developing motorcycles by integrating mechanical and electrical technologies. Technologies from two totally different areas are integrated into a highly innovative idea to come up with a useful industrial product. Therefore, integrating two or more technologies into a novel technological application has become a mode of human advancement.

With the popularity of digital cameras in recent years, traditional mechanical cameras nearly disappear from the market. The digital cameras integrated electronic and mechanical applications to capture and store images and rapidly transmit images to any place of the world through computer and Internet. Besides integrating technologies, the aforementioned example also integrates applications, and thus the relation among technologies in different fields and their applications becomes more complicated.

However, the digital cameras do not have further breakthroughs on its related technologies and applications in these years, in addition to enhancing resolution and reducing size. On the other hand, the present popular electronic products also include mobile phones, particularly the one with camera functions which is consumer's favorite. After carefully examining the camera functions of a mobile phone, we understand that any mechanically driven device cannot be added to the digital camera primarily adopting electronic technological applications due to the light, thin, short and compact limitations of the mobile phone in order to drive the focusing and zooming lens. The camera functions of the digital cameras sold in the market are superficial, and the quality of pictures taken is quite low.

Regardless of a standalone digital camera or being bundled into a mobile phone, it is necessary to challenge the limit of minimizing its size all the time. However, it requires the integration of electronic and mechanical applications to meet the high resolution standard, and thus such technical issue has become a bottleneck for manufacturers. The present invention involves technologies from different areas to overcome the bottleneck.

SUMMARY OF THE INVENTION

The primary objective of the present invention is to provide a multilayer single lens structure with zooming and focusing functions to overcome the shortcomings of the prior art that high-end digital cameras are oversized. In the invention, a high-end digital camera can be used in small electronic products or the size of a standalone digital camera can be greatly reduced. The present invention discloses a multilayer single lens structure with zooming and focusing functions, which comprises: an object lens layer; an adjustable object lens layer, capable of adjusting its index of refraction; an imaging lens layer; and a voltage regulating device; wherein the order of arranging the object lens layer and the adjustable object lens layer is interchangeable, and these layers are connected to the imaging lens layer, and the voltage regulating device is electrically connected to the adjustable object lens layer for supplying different voltages to achieve the zooming and focusing functions.

DETAILED DESCRIPTION OF THE PREFERRED EMBODIMENTS

The detailed description and technical characteristics of the present invention are described together with the drawings as follows.

Figure 1:
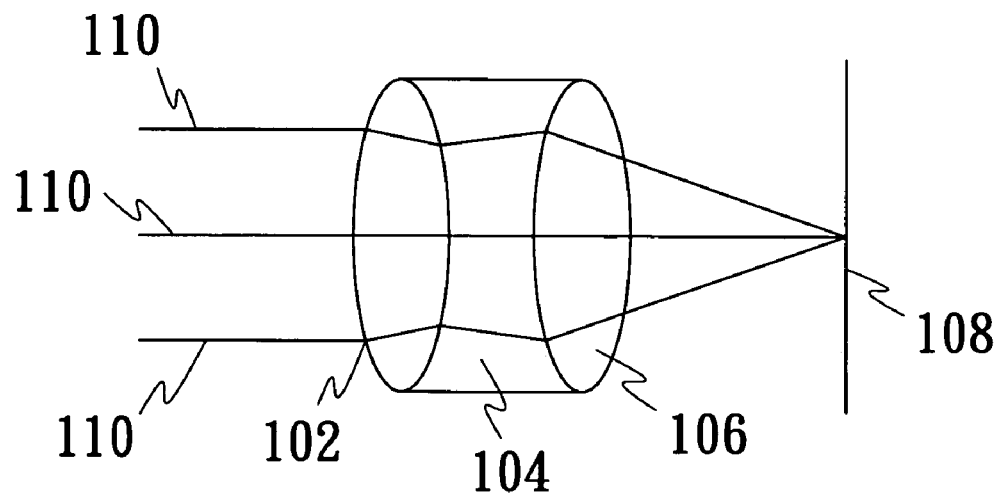
FIG. 1 is an illustrative view of a basic embodiment of the present invention.

The present invention relates to a multilayer single lens structure with zooming and focusing functions. Please refer to FIG. 1 for an illustrative view of a basic embodiment of the present invention. This embodiment comprises an object lens layer 102, an adjustable object lens layer 104 and an imaging lens layer 106; wherein the adjustable object lens layer 104 is an object lens layer capable of adjusting its index of refraction and made of a piezoelectric material or a non-linear optical axis dependent birefringence material, and the non-linear optical axis dependent birefringence material could be a potassium dihydrogen phosphate (KDP) crystal, a potassium titanium oxide phosphate (KTP) crystal, a beta-$BaB_2O_2$ crystal or $LiB_3O_5$ crystal; and a focusing light 110 passes through the object lens layer 102, an adjustable object lens layer 104 and the imaging lens layer 106 to produce an image focused at an imaging position 108.

Figure 2:
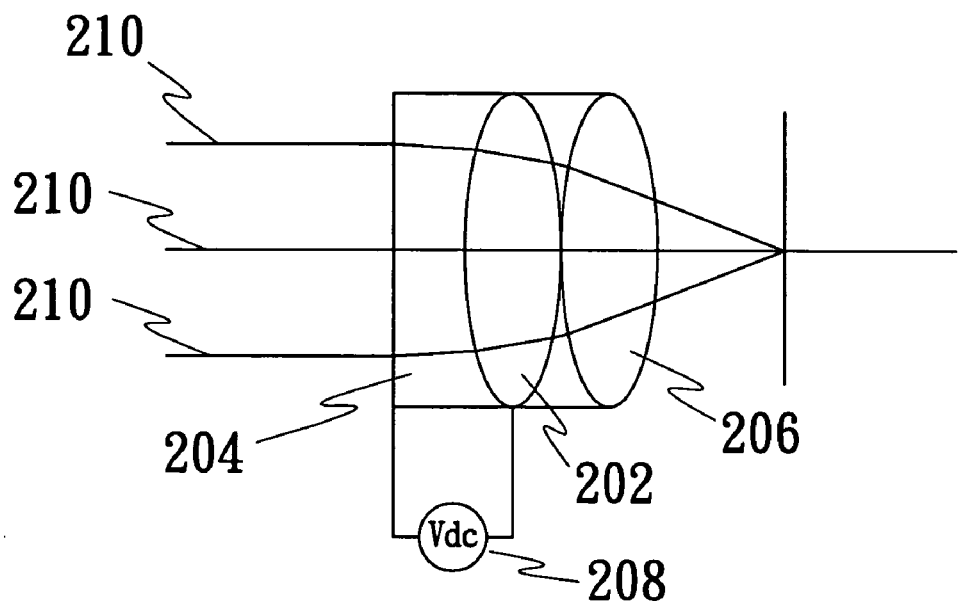
FIG. 2 is an illustrative view of a first preferred embodiment of the present invention.

Please refer to FIG. 2 for an illustrative view of a preferred embodiment of the present invention. This embodiment comprises: an adjustable object lens layer 204, an object lens layer 202, an imaging lens layer 206 and a voltage regulating device 208; wherein the voltage regulating device 208 is electrically connected to the adjustable object lens layer 204 for supplying different voltages. The aforementioned adjustable object lens layer 204 is an object lens layer capable of adjusting its index of refraction and made of a piezoelectric material or a non-linear optical axis dependent birefringence material. This embodiment adopts the non-linear optical axis dependent birefringence material. Therefore, different voltages are applied to control the deflection angle of the liquid crystal grains and adjust different indexes of refraction in order to achieve the objective of controlling the lens to zoom in and out by mechanical technology other than the prior art. If a focusing light 210 passes through the adjustable object lens layer 204, the object lens layer 202 and the imaging lens layer 206 to produce a focused image, different focal points can be obtained by the foregoing adjustable object lens layer 204 that can change its index of refraction.

Figure 3:
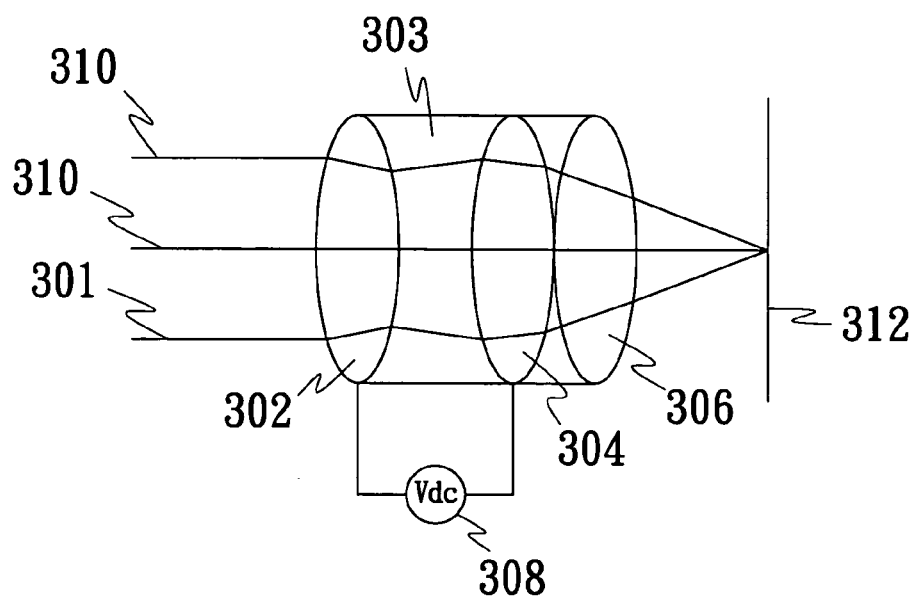
FIG. 3 is an illustrative view of a second preferred embodiment of the present invention.

Please refer to FIG. 3 for the illustrative view of the second preferred embodiment of the present invention. This embodiment comprises: an object lens layer 302, an adjustable object lens layer 303, a viewing object lens layer 304, an imaging lens 306 and a voltage regulating device 308; wherein this embodiment comes with a viewing object lens layer 304 to add the imaging scope and definition functions or filter some lights, in addition to the various focusing and zooming effects and functions. Therefore, if a focusing light 310 passes through the object lens layer 302, the adjustable object lens layer 303, the viewing object lens layer 304 and the imaging lens layer 306 to produce a focused image at an imaging position 312, the outcome will have the foregoing effects.

Figure 4:
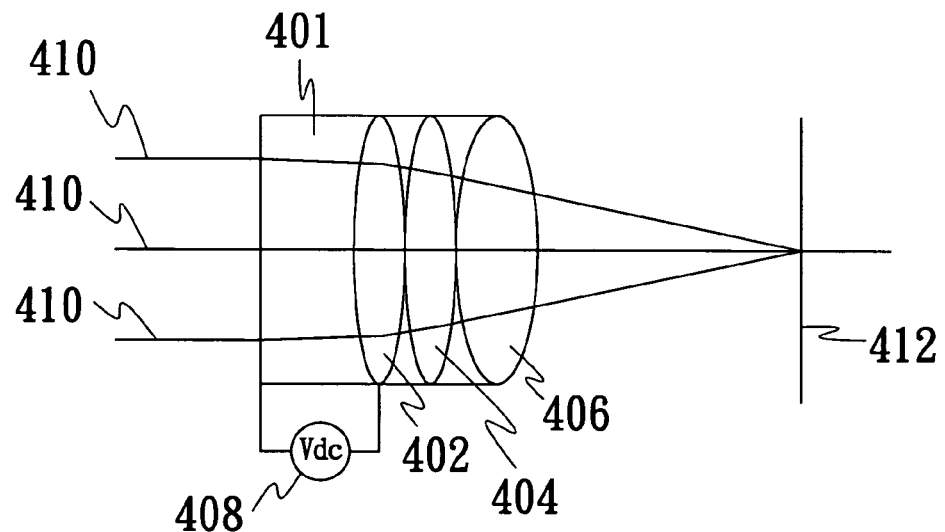
FIG. 4 is an illustrative view of a third preferred embodiment of the present invention.

Please refer to FIG. 4 for the third preferred embodiment of the present invention. This embodiment comprises an adjustable object lens layer 401, an object layer 402, a viewing lens layer, an imaging lens layer, and a voltage regulating device 408. A focusing light 410 can be focused at a farther imaging position 412 when the focusing light 410 passes through a combination of three successive object lens layers (including the object lens layer 402, the viewing object lens layer 404 and the imaging lens layer 406).

Figure 5:
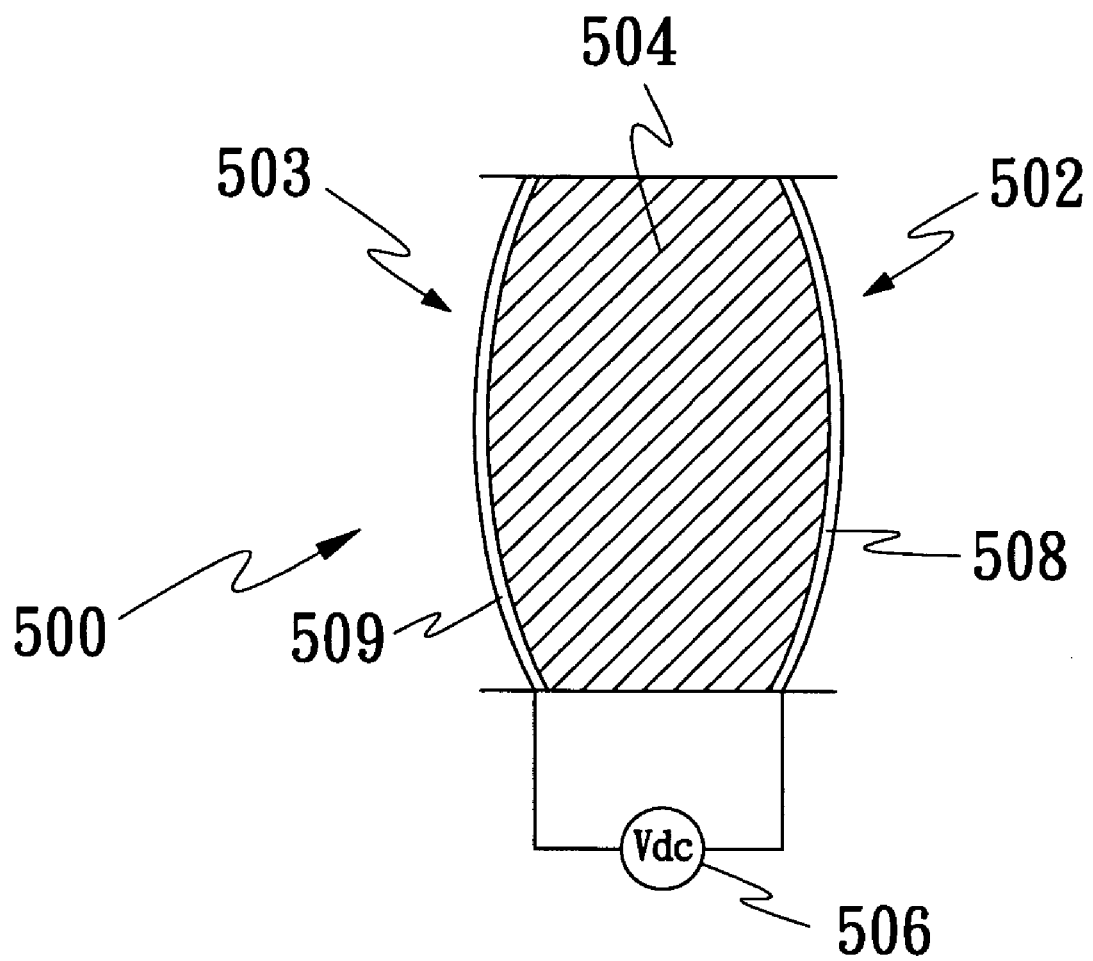
FIG. 5 is a structural diagram of the adjustable object lens layer of the present invention.

Please refer to FIG. 5 for the structural diagram of the adjustable object lens layer of the present invention. The adjustable object lens layer 500 comprises two basic layers 502, 503, each being electrically conductive; a crystal layer 504, being disposed between the two basic layers 502, 503 and supported and protected by the two basic layers 502, 503; two transparent conductors 508, 509, each being disposed on the opposite side of the contact surface between the two basic layers 502, 503 and the crystal layer 504 and is made of an indium tin oxide (ITO) and used together with a voltage regulating device 506. The voltage regulating device 506 supplies different voltages to the crystal layer 504 through the two basic layers 502, 503; wherein the basic layers 502, 503 are made of glass and plastic materials, and the crystal layer 504 is a nematic liquid crystal layer. Therefore, if different voltages are applied, the crystalline grains of the nematic liquid crystal layer will be twisted or deflected at different angles, so that the focusing light will penetrate to a certain extent and thus achieving the zooming and focusing functions of the present invention.

Figure 6:
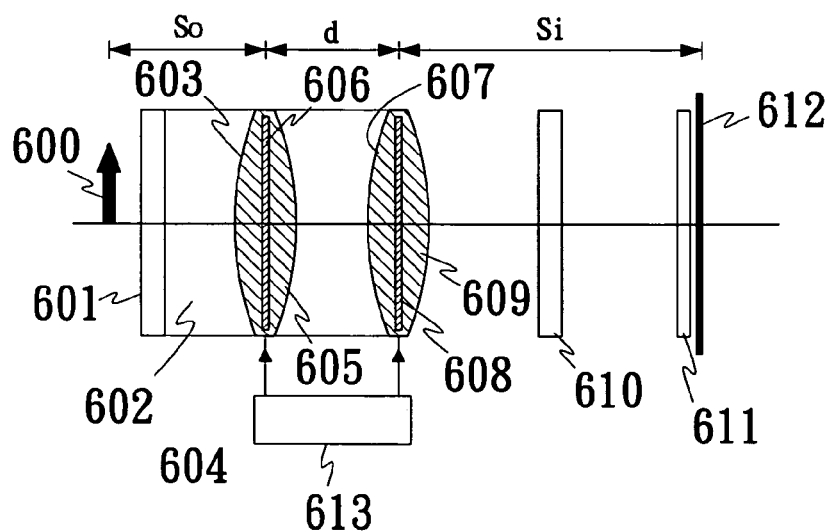
FIG. 6 is a view of applying two sets of multilayer single lens structures in accordance with the present invention.

Please refer to FIG. 6 for view of applying two sets of multilayer single lens structures in accordance with the present invention. FIG. 6 shows how an object 600 produces an image at the imaging position by means of the two sets of multilayer single lens structures in accordance with the first preferred embodiment of the present invention. Related parameters and symbols as shown in the figure are used to derive the related equation, and software simulated experiments and analyses are used to demonstrate that the technology of the present invention is feasible. FIG. 6 includes an object 600, an object lens layer 601, a gap 602, an object lens layer 603, an adjustable lens layer 604, an imaging lens layer 605, a gap 606, an object lens layer 607, an adjustable object lens 608, an imaging lens layer 609, a filter layer 610, a protective layer 611, a focused image layer 612, and a control unit 613; wherein the protective layer 611 is disposed on the focused image layer 612 for the protection; and the control unit 613 controls the voltage of the adjustable object lens layers 604, 608 depending on the distance of components. In the figure, $S_o$ is the distance between an object lens layer 601 and an adjustable lens layer 604; d is the distance between the adjustable object lens layer 604 and the next adjustable object lens layer 608; $S_i$ is the distance between the adjustable object lens layer 608 and the focused image layer 612; $f_1$ is the focal length of the object lens layer 630 and the imaging lens layer 605 according to the first set of multilayer single lens structures in accordance with the first preferred embodiment of the present invention; and $f_2$ is the focal length of the second set of multilayer single lens structures in accordance with the first preferred embodiment of the present invention, which is the focal length of the object lens layer 607 and the imaging lens layer 609. Therefore, the equation for each parameter or symbol is listed below:

$$S_i = \{f_2 d - [(f_1 f_2 S_o)/(S_o - f_1)]$$

$$\}/\{d - f_2 - [(f_1 S_o)/(S_o - f_1)]\} \quad (1)$$

where, $f_1$ and $f_2$ are optical focal lengths satisfying the following equations:

$$(1/f_{iL} + 1/f_{iNLCmin})^{-1} \square f_i \square$$

$$(1/f_{iL} - 1/f_{iNLCmin})^{-1}, i=1,2 \ldots \text{ for } \square f_{iL} \square \square f_{iNLC} \quad (2)$$

and $$-\square < f_i - (1/f_{iL} - 1/f_{iNLCmin})^{-},$$

$$(1/f_{iL} + 1/f_{iNLCmin})^{-1} \square f_{iL} < \square, i=1,2 \ldots$$

for $\square f_{iL} \square - f_{iNLC}$ \quad (3)

where, $f_L$ is the focal length of the object lens layer; $f_{NLCmin}$ is the minimum focal length of the adjustable object lens layer; and i is the number of sets of multilayer single lens structures. The embodiment as shown in this figure consists of two sets. Since the focused image layer 612 is fixed at a certain position, therefore $S_i$ is a constant. However, the $f_1$ and $f_2$ in Equation (1) are variables, and thus can satisfy different values of $S_0$.

For different values of $S_0$, $f_1$ and $f_2$ can simultaneously satisfy both Equations (2) and (3) to produce an effective focal length $f_e$. On the other hand, the amplification factor of the image produced on the focused image layer 612 after the optical zooming of the object 600 can be expressed by the following equation:

$$m = f_1 S_i/(dS_o - df_1 - S_o f_1) = (dS_i - df_2 - S_i f_2)/f_2 S_o \quad (4)$$

Figure 7:
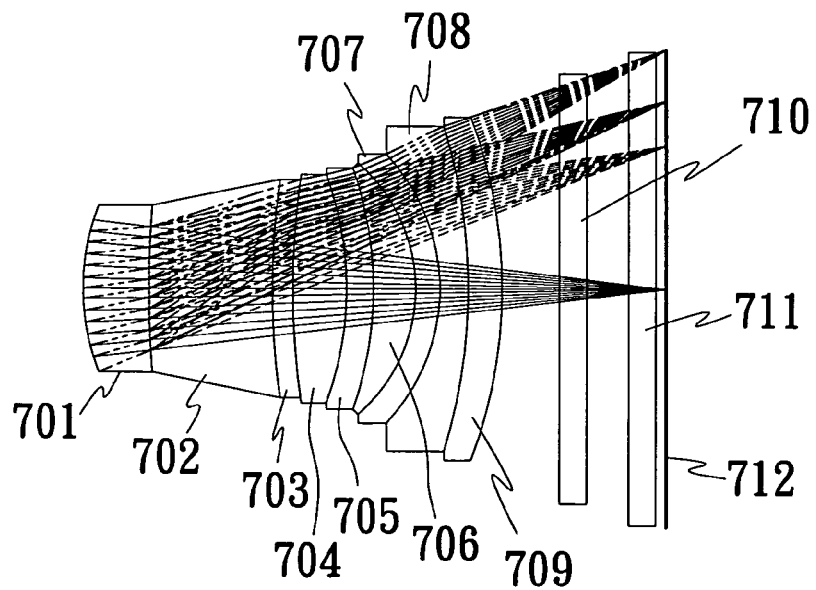
FIG. 7 is a view of the result computed by a software simulation program.

Therefore, the result computed by a software simulation program is shown in FIG. 7. The components in FIG. 7 are arranged according to all components in FIG. 6, which include an object lens layer 701, a gap 702, an object lens layer 703, an adjustable lens layer 704, an imaging lens layer 705, a gap 706, an object lens layer 707, an adjustable object lens 708, an imaging lens layer 709, a filter layer 710, a protective layer 711, and a focused image layer 712. The focuses indicated by different colors in the figure can be shown on the focused image layer 712. In other words, the foregoing parameters are used and different values of the parameters are changed to simulate several situations, and the final result is shown above. Therefore, it demonstrates that the technology in accordance with the present invention is definitely feasible.

In view of the technical characteristics of the present invention, the multilayer single lens structure with zooming and focusing functions makes use of the voltage accompanied by crystalline grains to achieve the zooming and focusing functions and fully overcome the shortcomings of the prior art being oversized and unable to be used for light, thin and compact electronic products due to its mechanical focusing and zooming structure. Therefore, regardless of the technical idea and the structural assembly, the present invention enhances the performance over the conventional structure and further complies with the patent application requirements and is submitted to the Patent and Trademark Office for review and granting of the commensurate patent rights.

What is claimed is:

1. A multilayer single lens structure with focusing and zooming functions, comprising:
    at least one object lens layer;
    at least one adjustable object lens layer, capable of adjusting its index of refraction;
    an imaging lens layer; and
    at least one voltage regulating device;
    wherein said object lens layer and said adjustable object lens layer come with an interchangeable order and are coupled to said imaging layer, and said voltage regulating device is electrically coupled to said adjustable object lens layer for supplying different voltages to achieve the zooming and focusing functions.

2. The multilayer single lens structure with focusing and zooming functions of claim 1, wherein said adjustable object lens layer is made of one selected from the collection of a piezoelectric material and a non-linear optical axis dependent birefringence material.

3. The multilayer single lens structure with focusing and zooming functions of claim 2, wherein said non-linear optical axis dependent birefringence material is one selected from the collection of a potassium dihydrogen phosphate (KDP) crystal, a potassium titanium oxide phosphate (KTP) crystal, a beta-$BaB_2O_2$ crystal and $LiB_3O_5$ crystal.

4. The multilayer single lens structure with focusing and zooming functions of claim 1, wherein said adjustable object lens further comprises:
    two basic layers, both being electrically conductive;
    a crystal layer, being disposed between said two basic layers and supported and protected by said two basic layers;
    at least two transparent conductors, each being disposed on the opposite side of a contact surface between said two basic layers and said crystal layer and jointly used with said voltage regulating device for supplying different voltages to said crystal layer through said two basic layers.

5. The multilayer single lens structure with focusing and zooming functions of claim 4, wherein said basic layer is made of one selected from the collection of a glass material and a plastic material.

6. The multilayer single lens structure with focusing and zooming functions of claim 4, wherein said crystal layer is a nematic liquid crystal layer.

7. The multilayer single lens structure with focusing and zooming functions of claim 1, wherein said transparent conductor is made of an indium tin oxide.

* * * * *